June 13, 1933.   C. H. GOLIKE   1,913,835
TIRE CARRIER
Filed June 15, 1931   4 Sheets-Sheet 1

Witness-
Wm C. Meiser

Charles Henry Golike
INVENTOR

BY Roy W. Johns
ATTORNEY

June 13, 1933.  C. H. GOLIKE  1,913,835
TIRE CARRIER
Filed June 15, 1931  4 Sheets-Sheet 2

Charles Henry Golike,
INVENTOR.

BY G. Roy W. Johns.
ATTORNEY

Witness-
Wm. C. Meiser

June 13, 1933.   C. H. GOLIKE   1,913,835
TIRE CARRIER
Filed June 15, 1931   4 Sheets-Sheet 4

Charles Henry Golike
INVENTOR

BY Roy W. Johns
ATTORNEY

WITNESS-
Wm C. Meiser

Patented June 13, 1933

1,913,835

UNITED STATES PATENT OFFICE

CHARLES HENRY GOLIKE, OF EVANSVILLE, INDIANA, ASSIGNOR TO INDUSTRIAL PATENTS CORPORATION, OF CHICAGO, ILLINOIS, A CORPORATION OF DELAWARE

TIRE CARRIER

Application filed June 15, 1931. Serial No. 544,332.

My invention relates to improved means for securing spare tires to trucks, my invention being particularly directed to means for securing pneumatic tires to trucks while such tires are not in actual use. It is understood, however, that my invention is adaptable for use in carrying other products or devices.

One of the other objects of my invention is to provide a tire carrying means which will hold tires securely in place.

Another object of my invention is to provide a tire carrying means which will minimize the danger of theft and yet be adaptable to easy insertion and removal of tires. It must be borne in mind, in this connection, that truck tires are usually of considerable weight and are difficult for a man to handle. For convenience, because of their weight and the difficulty of handling, spare tires for trucks are ordinarily carried on spare demountable rims or disc wheels, and as will be seen, my invention utilizes the rim or wheel as the case may be.

Other objects of my invention will be apparent from the following description of the two preferred embodiments of my invention illustrated in the accompanying drawings.

Referring now to the drawings in which similar characters of reference in the several figures indicate identical parts.

Figures 4, 6A:
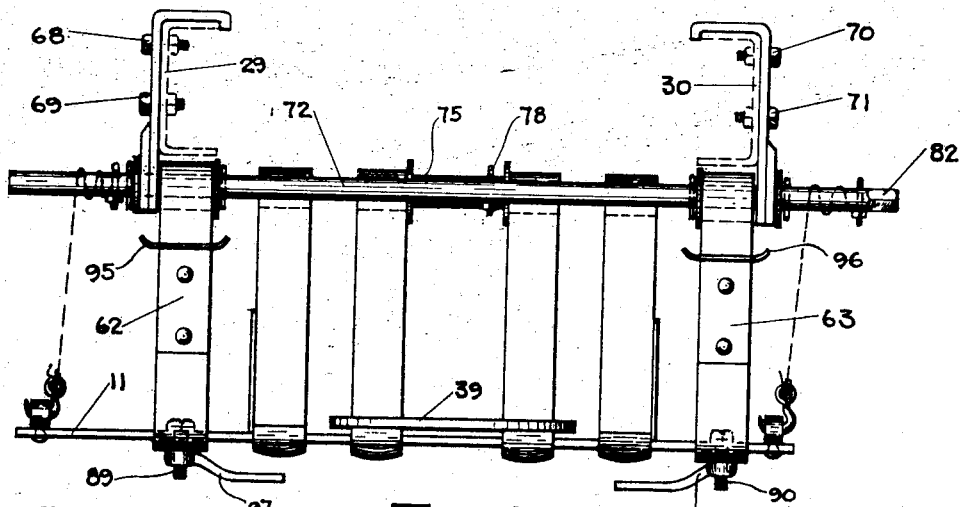
Figure 4 is an end view of the device.
Figures 5, 6:
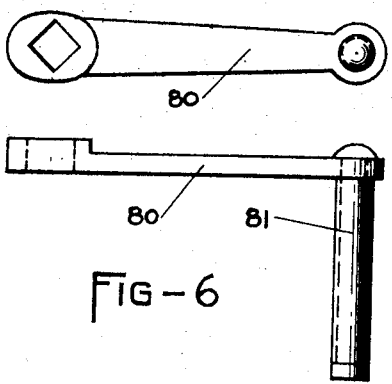
Figure 5 is a detail of the clamp bar.
Figure 6 is a detail of the crank handle.

Figure 6—A is a plan view of the crank handle.

Figure 7:
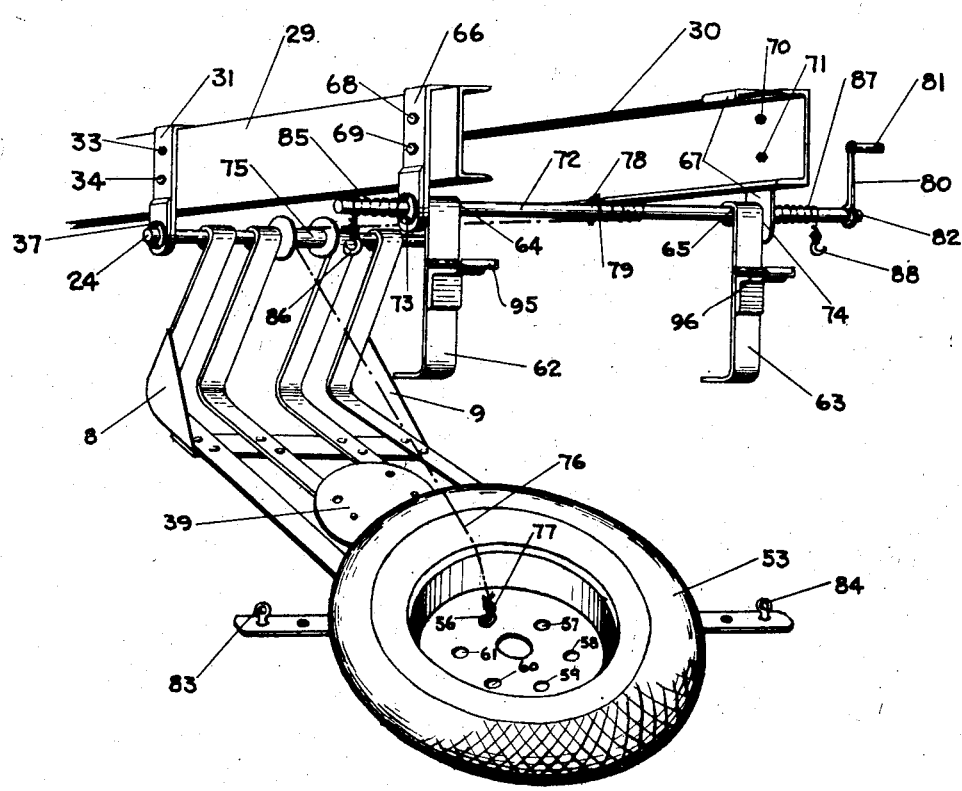

Figure 7 is a perspective view showing the cradle of the carrier open about to receive the tire for storage.

Figure 8:
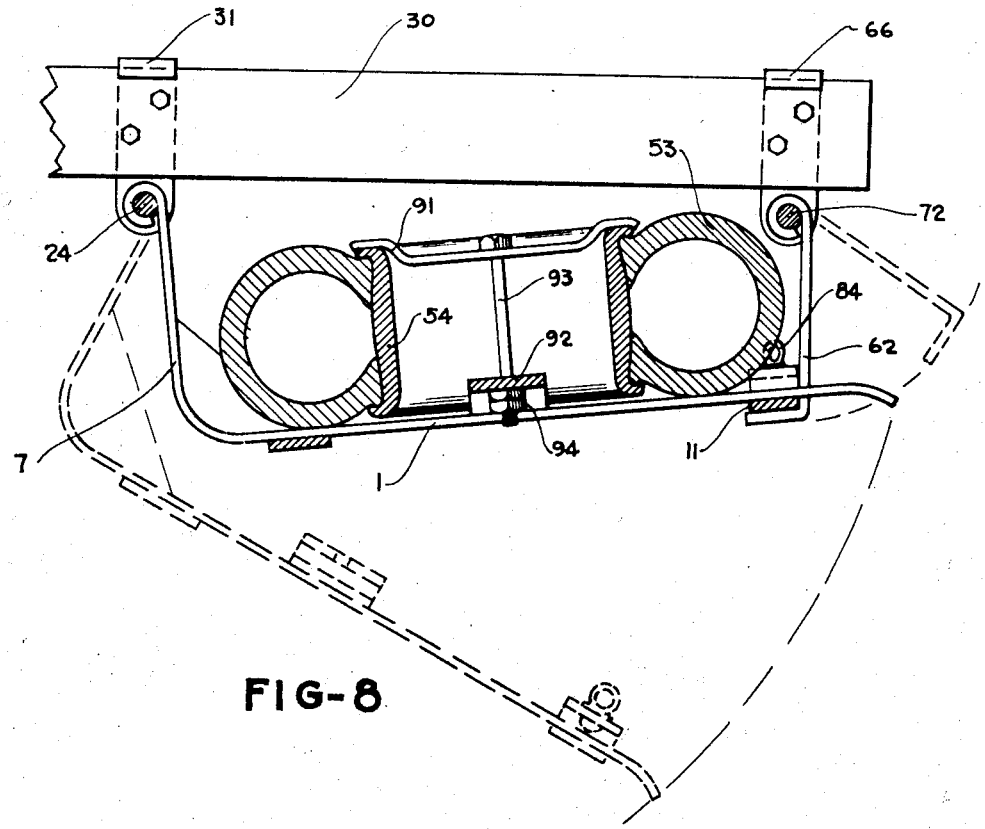

Figure 8 is a side view of a modification of my invention as used with a tire mounted on a demountable rim.

Figure 9:
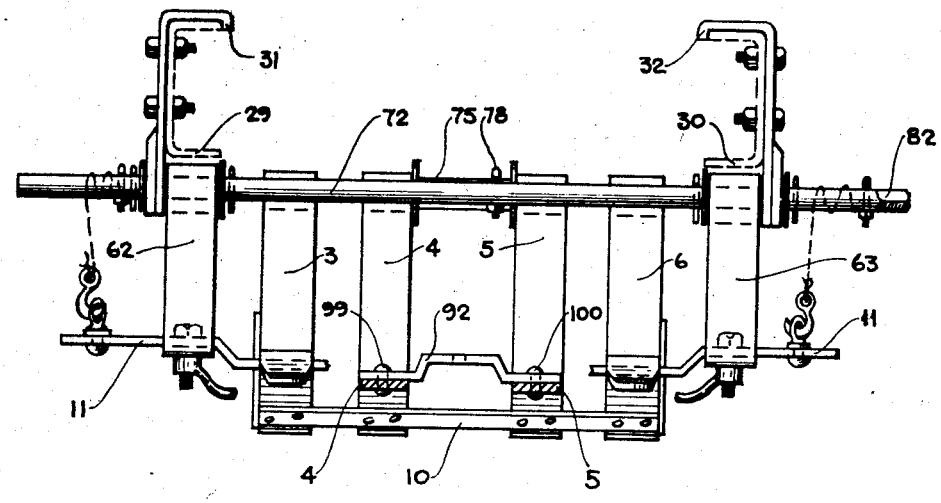

Figure 9 is an end view of another modification of the device.

I will first describe a preferred embodiment of my invention as used with a tire mounted on a disc wheel.

Figure 1:
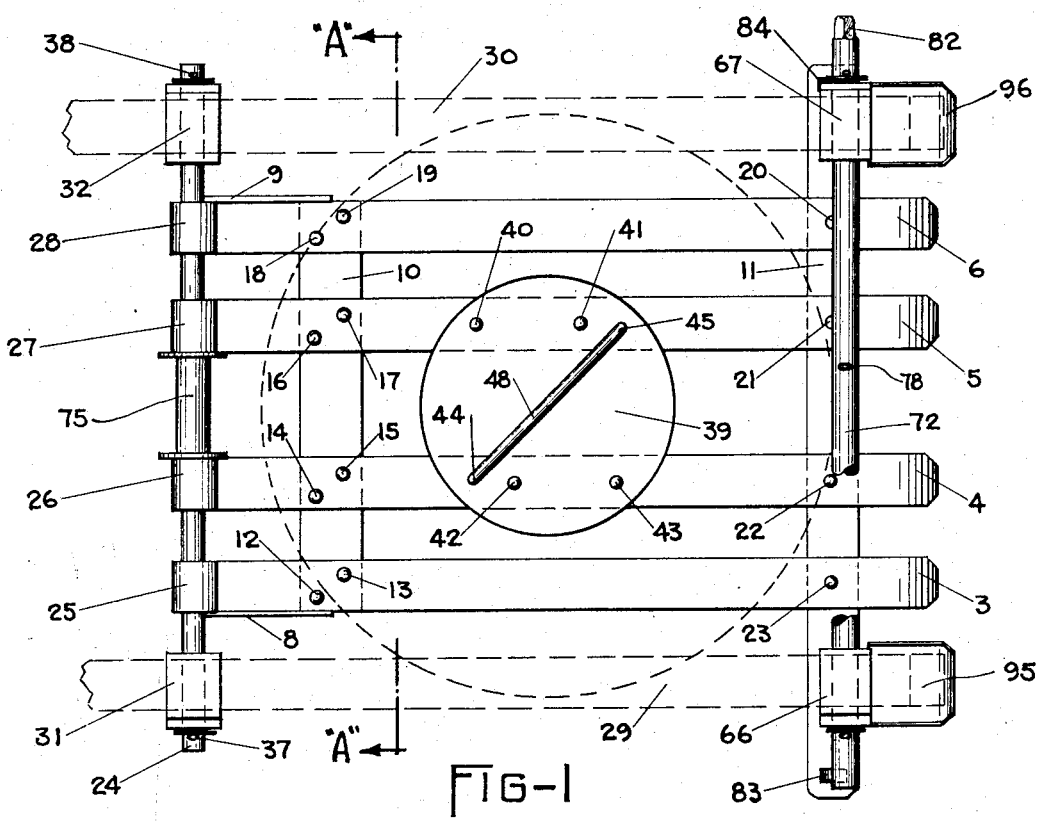
Figure 1 is a plan view.
Figure 2:
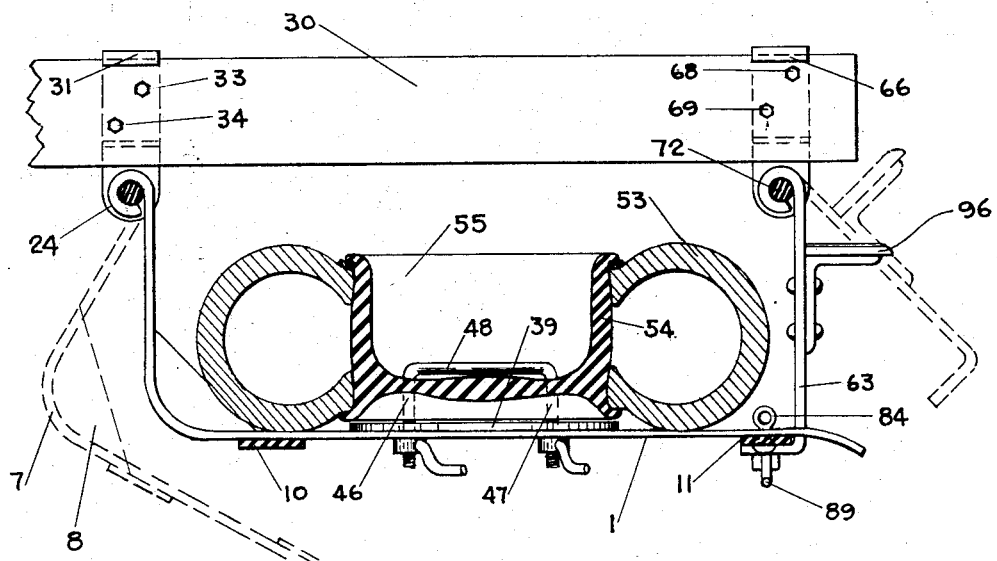
Figure 2 is a side view showing the device in use and also showing in dotted lines the manner in which the device opens up.
Figure 3:
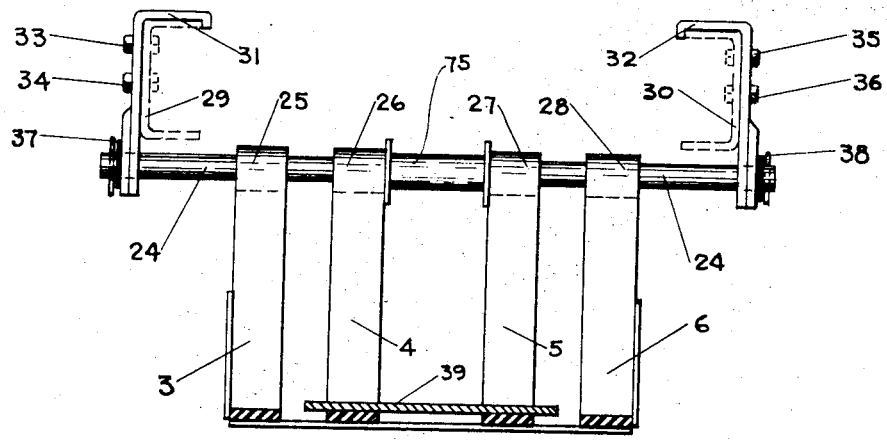
Figure 3 is a section through A—A of Figure 1.

Referring now particularly to Figure 2, cradle 1 shown in the dotted lines in the open position consists of a plurality of steel straps as shown in Figure 1, to-wit, straps 3, 4, 5 and 6, forming a ninety degree bend at 7, reinforced by gussets 8 and 9.

Straps 3, 4, 5 and 6 are joined by straps 10 and 11 by appropriate bolts or rivets, as 12, 13, 14, 15, 16, 17, 18, 19, 20, 21, 22 and 23.

It will be noted that straps 3, 4, 5 and 6 are rotatably mounted on an inner or rear transverse shaft 24 at 25, 26, 27 and 28, respectively. The chassis of the truck exemplified by channel beams 29 and 30 shown in Figure 7 supports the cradle 1 of the carrier through clamps 31 and 32 which may be fastened to the channel beams 29 and 30 by appropriate bolts such as 33, 34, 35 and 36. Clamps 31 and 32 carry shaft 24 which may be held in position by pins as 37 and 38. Plate 39 is mounted on cradle 1 by appropriate means, such as bolts 40, 41, 42 and 43 fastened through straps 4 and 5 as shown. Plate 39 is provided with holes 44 and 45 extending through straps 4 and 5.

The shanks 46 and 47 of U rod 48, are threaded to accommodate nuts 49 and 50, which nuts are provided with handles 51 and 52, respectively.

In Figure 2, tire 53 is shown mounted on the rim 54 of disc wheel 55. A conventional disc wheel is provided with a plurality of bolt openings as 56, 57, 58, 59, 60 and 61 more clearly shown in Figure 7. It is the function of these holes to permit attachment of the wheel to the hub of the truck. I utilize two of these holes for the insertion of shanks 46 and 47 of U rod 48. When the tire mounted upon this disc wheel is in its position, shanks 46 and 47 pass through the holes, as 57 and 60, through holes 44 and 45 in plate 39 and straps 4 and 5, being held in place by nuts 49 and 50, tightened up securely by a manual leverage secured through handles 51 and 52.

In Figure 7, it will be noted that straps 62 and 63 are rotatably mounted at 64 and 65 on a front or outer transverse shaft 72 which is rotatably mounted on bearings 73 and 74 of clamps 66 and 67 which are respectively held to chassis beams 29 and 30 by bolts 68, 69, 70 and 71.

Shaft 24 is provided with a chain spool 75 which is clearly shown in Figure 7, to which attention is now called. A chain 76 is provided with a hook 77 inserted into a hole as 56. A chain 76 passes over spool 75 and is fastened to pin 78 by appropriate means of a hook 79. Crank 80 provided with a handle 81 is placed on the squared end, 82, of shaft 72, winding up chain 76 on shaft 72, drawing tire 53 into position over plate 39. The tire is straightened up and shanks 46 and 47 of U rod 48 are inserted through the appropriate holes as hereinbefore indicated, nuts 49 and 50 being screwed up in place. Hook 77 is now disengaged from hole 56 in order to free chain 76 which has performed its function. The front and rear transverse shafts 24 and 72 extend across the chassis frame and are located beneath the same being carried by the depending portions of the clamps which engage the chassis frame. The front transverse shaft constitutes a combined windlass and supporting shaft.

It is to be noted that strap 11 extends beyond the edges of straps 3 and 6 and is provided at the ends with eyelets or fixed hooks 83 and 84.

It is to be noted also that shaft 72 extends beyond the outer surfaces of clamps 66 and 67. Chain 85 is affixed to one end of shaft 72 and is provided with hook 86. Chain 87 is affixed to the other end of shaft 72 and is provided with hook 88. After the tire has been fastened in place on plate 39, as has already been described, hook 86 is fastened to hook 83 and hook 88 is fastened to hook 84. Crank 80 is then manually operated through handle 81, drawing the bed of the cradle up into a horizontal position to permit straps 62 and 63 to be attached to strap 11 by appropriate bolts as 89 and 90 secured by nuts 97 and 98. Locks may be provided on nuts 97 and 98 to minimize the danger of theft.

After the tire carrier is in the closed position shown by the full lines in Figure 2, the crank 80 is removed and, if desired, chains 76, 85 and 87 may be also removed.

I will now describe another embodiment of my invention as used with a tire mounted on a demountable rim which is now the preferred type of equipment, especially in the larger trucks. This particular embodiment of my invention is illustrated in Figure 8 in which the differences from Figure 2 showing the typical disc wheel, are readily apparent. It will be noted in Figure 8 that rim 54 is locked to the cradle 1 by a clamp or plate 91 secured to plate 92 instead of plate 39 as shown in Figure 2. Bolt 93 passes through appropriate holes in clamp 91 and plate 92 drawing clamp 91 tightly against rim 54 by means of lock nut 94. Plate 92 may be secured to the appropriate straps of cradle, by rivets 99 and 100 and is sufficiently raised above the plane of cradle 1 at the point at which bolt 93 passes through to avoid having the end of bolt 93 and lock nut 94 being disposed below the plane of the cradle. It will be noted in Figure 8 that straps 62 and 63 are shorter than shown in Figure 2 in order that the floor of the cradle may be pulled up at an angle from the horizontal, bringing the tire up under the chassis more snugly, to lessen the possibility of loss of the tire in case clamp 91 or bolt 93 should become lost or broken.

In Figures 1, 2, 4 and 7, steps as 95 and 96 are shown for convenience in mounting the truck. These steps are not necessary in the embodiment illustrated in Figure 8 since the extension straps 3, 4, 5 and 6 are raised to almost the step position and may be used as steps.

Figure 9 differs from Figure 4 in that the extreme ends of strap 11 rise to permit nuts 97 and 98 to be disposed in the plane of the floor of the cradle.

While I have described but two specific embodiments of my invention, it will be understood that changes in detail and construction may be made without departing from the spirit of my invention as described in the following claims.

I claim:

1. In combination with a chassis frame, means for carrying a spare tire in a substantially horizontal position beneath the chassis frame including front and rear transverse shafts extending across the chassis frame at the bottom thereof, the front shaft constituting a combined windlass and supporting shaft, a tire supporting cradle mounted on the rear shaft to swing downwardly from a horizontal position, a flexible connection carried by the front shaft and having means for connecting it to the cradle for elevating the same from an inclined to a horizontal position, and supporting means carried by the front shaft for holding the cradle in a horizontal position.

2. In combination with a chassis frame, means for carrying a spare tire in a substantially horizontal position beneath the chassis frame including front and rear transverse shafts extending across the chassis frame at the bottom thereof, the front shaft constituting a combined windlass and supporting shaft, a tire supporting cradle mounted on the rear shaft to swing downwardly from a horizontal position, a spool arranged on the rear transverse shaft, a flexible connection passing over the spool and connected at one end to the front shaft and having means at the other end for connecting it with the tire for drawing the same upwardly upon the cradle, and means carried by the front shaft for supporting the cradle in a horizontal position.

3. In combination with a chassis frame, means for carrying a spare tire in a substantially horizontal position beneath the chassis frame including front and rear transverse shafts extending across the chassis frame at the bottom thereof, the front shaft constituting a combined windlass and supporting shaft, a tire supporting cradle mounted on the rear shaft to swing downwardly from a horizontal position, a spool arranged on the rear transverse shaft, a flexible connection passing over the spool and connected at one end to the front shaft and having means at the other end for connecting it with the tire for drawing the same upwardly upon the cradle, a separate flexible connection carried by the front shaft and provided with means for connecting it with the cradle for raising the same from an inclined to a horizontal position, and supporting means also carried by the front shaft for holding the cradle in a horizontal position.

4. In combination with a chassis frame, means for carrying a spare tire in a substantially horizontal position beneath the chassis frame including front and rear transverse shafts extending across the chassis frame at the bottom thereof, the front shaft constituting a combined windlass and supporting shaft, a tire supporting cradle mounted on the rear shaft to swing downwardly from a horizontal position, a chain spool mounted on the rear transverse shaft, a chain passing over the chain spool and connected at one end with the front transverse shaft and provided at its other end with means for connecting it with a tire for drawing the same upwardly upon the cradle, side chains carried by the front transverse shaft and provided with means for connecting them with the cradle for elevating the latter from an inclined to a horizontal position, and supporting means depending from the front transverse shaft for supporting the cradle in a horizontal position.

5. In combination with a chassis frame, means for carrying a spare tire beneath the chassis frame in a substantially horizontal position including front and rear clamps secured to the chassis frame and having depending portions, front and rear transverse shafts mounted in the depending portions of the clamps and extending across the chassis frame beneath the same, the front shaft constituting a combined windlass and supporting shaft, a cradle mounted on the rear transverse shaft to swing downwardly from a horizontal position, flexible means connected with the front transverse shaft for elevating the cradle from an inclined to a horizontal position, and supporting means depending from the front transverse shaft for supporting the cradle in a horizontal position.

Signed at Evansville, in the county of Vanderburg and State of Indiana, this 9th day of June, 1931.

CHARLES HENRY GOLIKE.